United States Patent Office 3,573,964
Patented Apr. 6, 1971

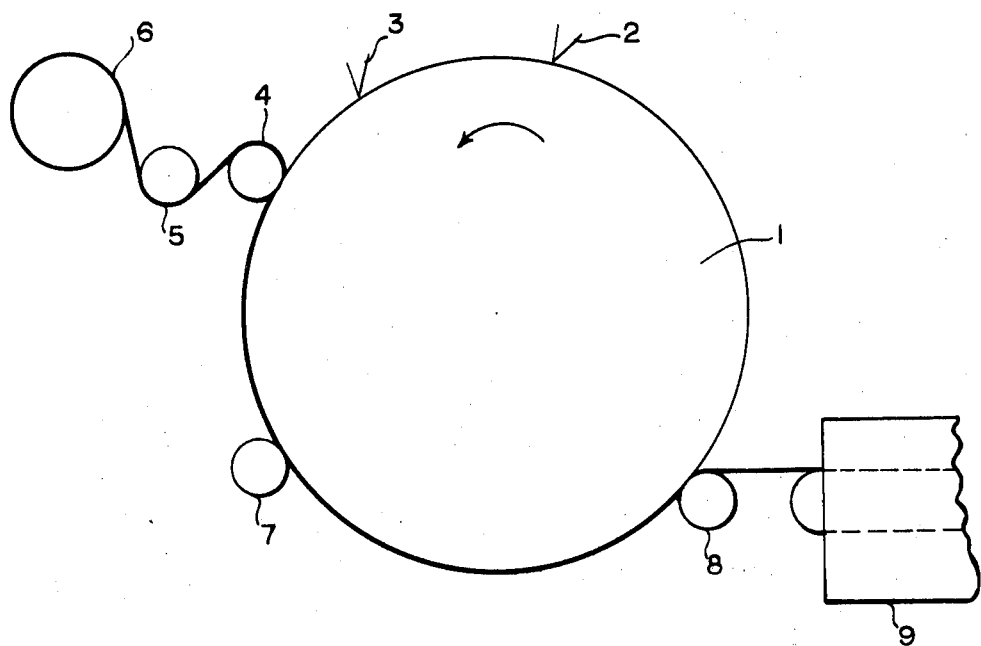

3,573,964
PROCESS FOR PREPARING FABRIC-VINYL RESIN LAMINATES
Peter William Jones, Loughborough, England, assignor to Fisons Industrial Chemicals Limited, Loughborough, England
Filed June 11, 1968, Ser. No. 736,199
Int. Cl. B29c 13/04; B32b 5/18
U.S. Cl. 117—76  14 Claims

ABSTRACT OF THE DISCLOSURE

Coating of plastic materials are applied to fabrics by applying at least one coating of plastisol to the surface of an internally heated rotating cylinder wherein the surface possesses the property of release with respect to the plastisol, applying the plastisol to a fabric just prior to the gelling of the plastisol to form a laminate, pressing the laminate against the cylinder, removing the laminate from cylinder and fusing the plastisol.

---

The present invention relates to a method and apparatus for applying coatings of vinyl and like plastics to fabrics.

Due to the instability of fabrics, especially knitted fabrics under tension, a transfer method of applying vinyl and like plastics to fabrics is commonly employed. In this method a plastisol of the vinyl plastic is applied to a release paper and, just before the plastisol gels, the fabric is laminated thereto, after which the plastisol is fully fused and the release paper stripped off. This method suffers from several inherent disadvantages namely: (1) the cost of the release paper, (2) the difficulties associated with handling and coating paper and (3) occasional troubles during the stripping process.

It has now been found that if the film is formed on a heated cylinder held at a temperature adapted to gel, but not fuse, the plastisol and the fabric is laminated to the plastisol on the cylinder just before it gels, the gelled plastisol/fabric laminate thereby obtained can be removed from the cylinder without sticking and can withstand the tension necessary to draw the laminate through a heated oven where the plastisol can be fused.

By the term gel is meant that stage wherein the plastisol mixture comprising a vinyl or other plastic material and a plasticizer becomes a homogeneous phase and non-flowing. This occurs after holding the plastisol mixture at a temperature of 100° C. to 150° C. for 2.5 to 0.2 minutes, the higher the temperature of gelation the lower being the time of gelation.

By the term fusion is meant that stage wherein the plastisol mixture is fully gelled and develops its optimum mechanical strength and any blowing agents which are present are decomposed.

Accordingly the present invention provides an apparatus for applying coatings of plastic material to a fabric which comprises a rotatable cylinder coated with a release material or having a surface of a metal having the properties of a release material, means for heating the cylinder internally, one or more coating heads adapted to apply one or more coatings of plastisol to the cylinder, a laminating unit adapted to apply a fabric to the outermost coating of plastisol and so form a laminate, one or more rubber pressure rollers to maintain said laminate on said cylinder and means for stripping said laminate from said cylinder.

The present invention also provides a process for applying coatings of plastic material to a fabric which comprises applying to a rotating cylinder heated internally and coated with a release material or having a surface of a metal having the properties of a release material one or more coatings of a plastisol, applying to the coating or coatings of plastisol just before it gels a layer of fabric to form a laminate, pressing said laminate to the cylinder, stripping said laminate from the cylinder and heating said laminate to fuse the plastisol.

The method and apparatus of the present invention are especially useful in the manufacture of cellular vinyl leather cloth. Accordingly a specific embodiment provides a process for making vinyl leather cloth which comprises applying to a rotating cylinder heated internally and coated with a release material or having a surface of a metal having the properties of a release material two coatings of a plastisol of a vinyl homopolymer or copolymer for example polyvinyl chloride, the second of the two coatings being of a plastisol containing a blowing agent, applying to the second coating just before the second coatings gels a layer of fabric to form a laminate, pressing said laminate to the cylinder, stripping the laminate resulting from these coating operations from the cylinder and heating the laminate to decompose the blowing agent and fuse the plastisols.

The present invention also provides an apparatus for making a cellular vinyl leather cloth which comprises a rotatable cylinder heater internally and coated with a release material or having a surface of a metal having the properties of a release material, two coating heads, the first of which is adapted to apply a coating of a plastisol of a vinyl compound to the cylinder and the second of which is adapted to apply a coating of a plastisol of a vinyl compound incorporating a blowing agent to said first coating, a laminating unit adapted to apply a fabric to the outermost coating of plastisol and so form a laminate, one or more rubber pressure rollers to maintain said coating in contact with said cylinder and means for stripping the laminate resulting from said coatings from said cylinder.

The cylinder may be coated with a release material such as a silicone rubber or polytetrafluoroethylene or may be constructed of stainless steel which has the properties of a release material. Preferably in the process and apparatus of the present invention the cylinder contains oil maintained thermostatically at a given elevated temperature. The temperature is desirably such as to gel the plastisol or plastisols but is sufficiently low to avoid fusing of the plastisol or to avoid decomposing the blowing agent if present.

The blowing agent may be an azo compound, an N-nitroso compound, a sulphonhydrazide or an acid azide. Preferably the blowing agent is azodicarbonamide, pp'-oxybis (benzene sulphonhydrazide), dinitrosopentamethylenetetramine, azoisobutyronitrile or benzene sulphonhydrazide.

The plastisol is prepared by blending together in a suitable mill the vinyl plastic and a plasticizer. Optionally pigments, fillers, stabilisers, lubricants and the like may be present. Suitable plasticizers include phthalate esters such as dioctyl phthalate, butyl benzyl phthalate, phosphates such as tritolyl phosphate, trioctyl phosphate and sebacic acid esters such as dioctyl sebacate.

The coating heads used in the present invention are preferably water cooled and insulated in order to prevent gelation of the plastisol in the coating head.

The laminating unit suitably comprises mounts for a reel of fabric, a slatted opening roller around which fabric taken from the reel is passed and a rubber pressure roller which presses the fabric into the plastisol applied at the last coating head. The lamination is preferably made at the point where solvation of the plastisol is sufficiently advanced to make the coating tacky, i.e. immediately prior to gelation. This point will vary with the weight of the coating applied and, therefore, it is preferred that the laminating unit be movable through an arc around the cylinder.

The rubber pressure rollers used in the present invention are preferably pneumatically operated. Their function is to clamp the fabric to the cylinder, thus ensuring a good bond between fabric and coating.

Although the main advantages of the present process would be in coating dimensionally unstable fabrics such as tricot, knitted fabrics or scrim fabrics, all types of fabrics can in fact be coated.

The present invention is illustrated in the accompanying drawings.

The only figure of the drawings illustrates diagrammatically an elevational section of an apparatus according to the invention.

The apparatus illustrated in the drawings consists of an oil filled rotatable stainless steel cylinder 1 the temperature of the oil being thermostatically controlled by means not shown. Two insulated and water-cooled coating heads 2 and 3 are adapted to supply plastisol and coat it in the case of coating head 2 onto the surface of the cylinder 1 as it rotates in an anti-clockwise direction and, in the case of coating head 3, onto the coating provided by coating head 2.

A laminating unit consists of a pneumatically operating pressure roller 4, a slatted opening roller 5 and a reel of fabric 6. The fabric is taken from its reel 6 and passed around opening rollers 5 and pressure roller 4 where it is pressed into and adheres to the plastisol which was applied by coating head 3 to form a laminate. The laminating unit is movable through an arc around cylinder 1 so that the fabric can be applied to the plastisol coating immediately before it gels.

Two pneumatically operated pressure rollers 7 and 8 are provided which serve to insure a good bond between the fabric and coating and prevent premature release of the laminate from the cylinder.

The laminate is passed from pressure roller 8 to an oven where it is heated to decompose any blowing agent which may be present and to fuse the resin. From the oven the laminate may be embossed, printed, lacquered, etc. by conventional methods.

The following example is given to illustrate the process of the present invention.

EXAMPLE

A plastisol containing the following ingredients was spread at 0.08 inch thick on a 3 foot diameter rotating cylinder heated internally by oil at 132° C.

| | Parts by weight |
|---|---|
| Polyvinyl chloride | 100 |
| Dioctyl phthalate | 60 |
| Epoxidised oil | 5 |
| Barium/cadmium stabiliser | 7 |

After 10 seconds in contact with the cylinder, a further coating of 0.013 inch was applied the composition of the second coating being:

| | Parts by weight |
|---|---|
| Polyvinyl chloride | 100 |
| Dioctyl phthalate | 65 |
| Butyl benzyl phthalate | 20 |
| Filler | 5 |
| Azodicarbonamide | 4 |
| Liquid cadmium/zinc | 2.5 |

Following a further 15 seconds heating a tricot was laminated, the complete laminate being stripped from the cylinder after a further 10 seconds heating. The total time from application of the first coating to stripping the composite from the rotating cylinder was 35 seconds. The intermediate layer was expanded and both layers were fused by passing the coated tricot through an oven maintained at a temperature of 195° C. The oven residence time was approximately 45 seconds.

I claim:
1. A process for applying coatings of plastic material to a fabric, which process comprises:
   (a) applying at least one coating of a liquid vinyl resin plastisol onto the surface of a rotating cylinder, the cylinder having a surface which has the properties of a release material, and which cylinder is heated internally to a temperature sufficient to gell the plastisol coating;
   (b) applying to the exposed surface of the plastisol coating on the surface of the cylinder before the plastisol coating gells, a layer of fabric to form a laminate;
   (c) pressing said laminate so formed to the surface of the cylinder;
   (d) heating the plastisol coating to a temperature sufficient to gell the plastisol coating and to bond the fabric of the laminate to the gelled plastisol coating while pressing said laminate to the surface of the cylinder;
   (e) stripping the laminate comprising the gelled plastisol coating and the fabric bonded thereto from the cylinder;
   (f) heating the striped laminate to a temperature sufficient to fuse the plastisol coating.

2. A process as claimed in claim 1 wherein the coating of the laminate is heated to a temperature of from about 100 to 150° C. for a period of time of between 0.2 and 2.5 minutes to gell the plastisol coating.

3. A process as claimed in claim 1 wherein the fabric applied to the plastisol coating is a dimensionally unstable fabric applied to the coating under tension.

4. A process as claimed in claim 1 which includes applying at least one coating of a liquid vinyl resin plastisol onto the upper surface of a rotating cylinder from a stationary coating head disposed in a coating relationship with the surface by rotating the cylinder in a concurrent direction to the direction in which the fabric is applied to the surface of the plastisol coating to form the laminate.

5. A process as claimed in claim 1 wherein the fabric is applied to the surface of the plastisol coating at a point immediately prior to gellation.

6. A process as claimed in claim 1 wherein substantially all the heat to gell the coating is obtained from the internal heated cylinder.

7. A process as claimed in claim 1 wherein two coatings of a plastisol of polyvinyl compound for example polyvinyl chloride, are applied to the cylinder the second of the two coatings being of a plastisol containing a blowing agent, a layer of fabric being applied to the second coating just before the second coating gels to form a laminate, said laminate being pressed to the cylinder, the laminate resulting from these coating operations being stripped from the cylinder and the laminate being heated to decompose the blowing agent and fuse the plastisols.

8. A process as claimed in claim 1 wherein the cylinder is coated with a silicone rubber or polytetrafluoroethylene.

9. A process as claimed in claim 1 wherein the cylinder has a surface of stainless steel.

10. A process as claimed in claim 1 wherein the cylinder contains oil maintained thermostatically at a given elevated temperature.

11. A process as claimed in claim 2 wherein the temperature at which gelling of the plastisol layer occurs is insufficient to cause decomposition of the blowing agent present.

12. A process as claimed in claim 7 wherein the blowing agent is azodicarbonamide, p,p'-oxybis(benzenesulphonhydrazide), dinitrosopentamethylenetetramine, azoisobutyronitrile or benzene sulphonhydrazide.

13. A process for applying coatings of plastic material to a fabric, which process comprises:
   (a) applying at least one coating of a liquid vinyl chloride resin plastisol onto the surface of a rotating cylinder, the cylinder having a surface which has the properties of a release material, and which cylinder is heated internally to a temperature sufficient to gell the plastisol coating;

(b) applying a layer of a dimensionally unstable fabric onto the exposed surface of the plastisol coating on the surface of the cylinder at a point immediately prior to gellation of the plastisol coating, which layer is applied under tension to form a laminate;

(c) pressing said laminate so formed to the surface of the cylinder;

(d) heating the plastisol coating on the surface of the cylinder to a temperature of from about 100 to 150° C. for a period of time between about 0.1 and 2.5 minutes to gell the plastisol coating, substantially all of the heat to gell the coating being obtained from the internal heated cylinder, and while heating, pressing the laminate to the surface of the cylinder;

(e) stripping the laminate from the surface of the rotating cylinder; and (f) heating the stripped laminate to a temperature sufficient to fuse the plastisol coating in the laminate.

14. A process as claimed in claim 13 wherein at least two coatings of a vinyl chloride resin plastisol are applied onto the surface of a rotating cylinder, one on top of the other, the second of the two coatings containing a blowing agent and wherein the temperature employed to gell the plastisol is insufficient to decompose the blowing agent in the second coating, and wherein the heating of the stripped laminate to a temperature sufficient to fuse the plastisol coating also is sufficient to decompose the blowing agent and to create a laminate having a cellular layer therein.

References Cited

UNITED STATES PATENTS

| | | | |
|---|---|---|---|
| 2,128,312 | 8/1938 | Murphy | 156—231 |
| 2,169,288 | 8/1939 | Reynolds | 156—231 |
| 2,700,630 | 1/1955 | Bukey et al. | 156—231X |
| 2,842,473 | 7/1958 | Oberly et al. | 156—246 |
| 2,956,917 | 10/1960 | Fasano | 156—231X |
| 3,009,847 | 11/1961 | Alles et al. | 156—231X |
| 3,032,815 | 5/1962 | Gerber | 156—231X |
| 3,043,728 | 7/1962 | Stauffer | 156—231 |
| 3,196,062 | 7/1965 | Kristal | 156—231X |
| 3,312,586 | 4/1967 | Barlow | 156—231X |
| 3,446,693 | 5/1969 | Alig et al. | 156—79X |

OTHER REFERENCES

The Paper Industry and Paper World for December 1944, "Some Fundamentals of Coating Methods," by Frank W. Egan, pp. 1142–1145 and 1148.

Modern Plastics Encyclopedia, 1968, vol. 45, No. 1A, pp. 279 and 895.

HAROLD ANSHER, Primary Examiner

G. W. MOXON II, Assistant Examiner

U.S. Cl. X.R.

117—111, 161; 156—79, 231, 242